US011132561B2

(12) United States Patent
Takahashi et al.

(10) Patent No.: US 11,132,561 B2
(45) Date of Patent: Sep. 28, 2021

(54) INFORMATION PROCESSING DEVICE, INFORMATION PROCESSING METHOD, AND NON-TRANSITORY COMPUTER-READABLE RECORDING MEDIUM

(71) Applicant: Panasonic Intellectual Property Corporation of America, Torrance, CA (US)

(72) Inventors: Masaki Takahashi, Osaka (JP); Yasunori Ishii, Osaka (JP); Ryota Fujimura, Kanagawa (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 69 days.

(21) Appl. No.: 16/445,828

(22) Filed: Jun. 19, 2019

(65) Prior Publication Data

US 2019/0392226 A1   Dec. 26, 2019

(30) Foreign Application Priority Data

Jun. 25, 2018 (JP) .............................. JP2018-119723
Jan. 30, 2019 (JP) .............................. JP2019-014506

(51) Int. Cl.
*G06K 9/32* (2006.01)
*G06K 9/00* (2006.01)
*G06K 9/62* (2006.01)

(52) U.S. Cl.
CPC ..... *G06K 9/00798* (2013.01); *G06K 9/00805* (2013.01); *G06K 9/3233* (2013.01); *G06K 9/6277* (2013.01)

(58) Field of Classification Search
CPC .. G06K 9/00805; G06K 9/00369; G06K 9/00; G06K 9/00798; G06K 9/62;
(Continued)

(56) References Cited

U.S. PATENT DOCUMENTS 9,286,520 B1 * 3/2016 Lo .............................. G06T 7/90
2010/0128983 A1 * 5/2010 Sugai ....................... G06K 9/34
382/173

(Continued)

FOREIGN PATENT DOCUMENTS

JP    2017-167608    9/2017

OTHER PUBLICATIONS

Partial European Search Report dated Nov. 4, 2019 in corresponding European Patent Application No. 19180164.6.
(Continued)

*Primary Examiner* — Carol Wang
(74) *Attorney, Agent, or Firm* — Wenderoth, Lind & Ponack, L.L.P.

(57) ABSTRACT

An information processing device is configured to: obtain sensing data from an optical sensor; obtain position information of a mobile body which includes the optical sensor; obtain map information; determine, in sensing data, a specific sensing data region corresponding to a specific region in a sensing region of the optical sensor by using the position information and the map information that have been obtained; determine input information to be provided to an object detection model, according to the specific sensing data region; and cause the object detection model to perform object detection processing by using the input information.

10 Claims, 11 Drawing Sheets

(58) Field of Classification Search
CPC ...... G06K 9/6277; G06K 9/3233; G06K 9/32; G06K 9/00791; B60W 40/00
See application file for complete search history.

(56) References Cited

U.S. PATENT DOCUMENTS

| | | | |
|---|---|---|---|
| 2016/0223343 A1* | 8/2016 | Averbuch | G01C 21/26 |
| 2017/0011281 A1* | 1/2017 | Dijkman | G06K 9/66 |
| | | | 382/103 |
| 2017/0046958 A1* | 2/2017 | Naka | G08G 1/16 |
| | | | 701/117 |
| 2018/0107871 A1* | 4/2018 | Singj | G06K 9/00369 |
| | | | 382/103 |
| 2018/0118130 A1* | 5/2018 | Karabed | G06K 9/00791 |
| 2018/0167522 A1* | 6/2018 | Kunieda | G06K 9/628 |

OTHER PUBLICATIONS

G. Ros et al., "Vision-based Offline-Online Perception Paradigm for Autonomous Driving", 2015 IEEE Winter Conference on Applications of Computer Vision, IEEE, Jan. 5, 2015, pp. 231-238.

* cited by examiner

INFORMATION PROCESSING DEVICE, INFORMATION PROCESSING METHOD, AND NON-TRANSITORY COMPUTER-READABLE RECORDING MEDIUM

CROSS REFERENCE TO RELATED APPLICATIONS

This application claims the benefit of priority of Japanese Patent Application Number 2018-119723 filed on Jun. 25, 2018 and 2019-014506 filed on Jan. 30, 2019, the entire contents of which are hereby incorporated by reference.

BACKGROUND

1. Technical Field

The present disclosure relates to an information processing device, an information processing method, and a non-transitory computer-readable recording medium.

2. Description of the Related Art

In recent years, many self-driving cars (robot cars) driven by a machine instead of a driver have been studied and commercialized. A self-driving car includes an object detecting device for detecting objects around the self-driving car. Japanese Unexamined Patent Application Publication No. 2017-167608 proposes an object recognition device which sets a priority recognition region to the region near another vehicle detected, and recognizes pedestrians in the priority recognition region.

SUMMARY

However, in the conventional technique, an increased amount of calculation resources for object detection may be required. For example, in Japanese Unexamined Patent Application Publication No. 2017-167608, since detection of pedestrians is performed after detection of vehicles, detection processing is performed at least twice. Accordingly, a larger amount of calculation resources is used compared to the case where detection processing is performed once.

In view of the above, an object of the present disclosure is to provide an information processing device, an information processing method, and a program which are capable of improving object detection performance, while reducing an increase in calculation resources required for object detection.

An information processing device according to one aspect of the present disclosure is configured to obtain sensing data from an optical sensor; obtain position information of an object which includes the optical sensor; obtain map information; determine a specific sensing data region in the sensing data by using the position information and the map information, the specific sensing data region corresponding to a specific region in a sensing region of the optical sensor; and determine, according to the specific sensing data region, input information to be provided to an object detection model, and cause the object detection model to perform object detection processing by using the input information.

Moreover, an information processing method, according to one aspect of the present disclosure, which is performed by a processor and which includes: obtaining sensing data from an optical sensor; obtaining position information of an object which includes the optical sensor; obtaining map information; determining a specific sensing data region in the sensing data by using the position information and the map information, the specific sensing data region corresponding to a specific region in a sensing region of the optical sensor; determining input information to be provided to an object detection model, according to the specific sensing data region; and causing the object detection model to perform object detection processing by using the input information.

Moreover, a recording medium according to one aspect of the present disclosure is a non-transitory computer-readable recording medium on which a program for causing a computer to perform the information processing method is recorded.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

The information processing device and the like according to one aspect of the present disclosure is capable of improving object detection performance, while reducing an increase in calculation resources required for object detection.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
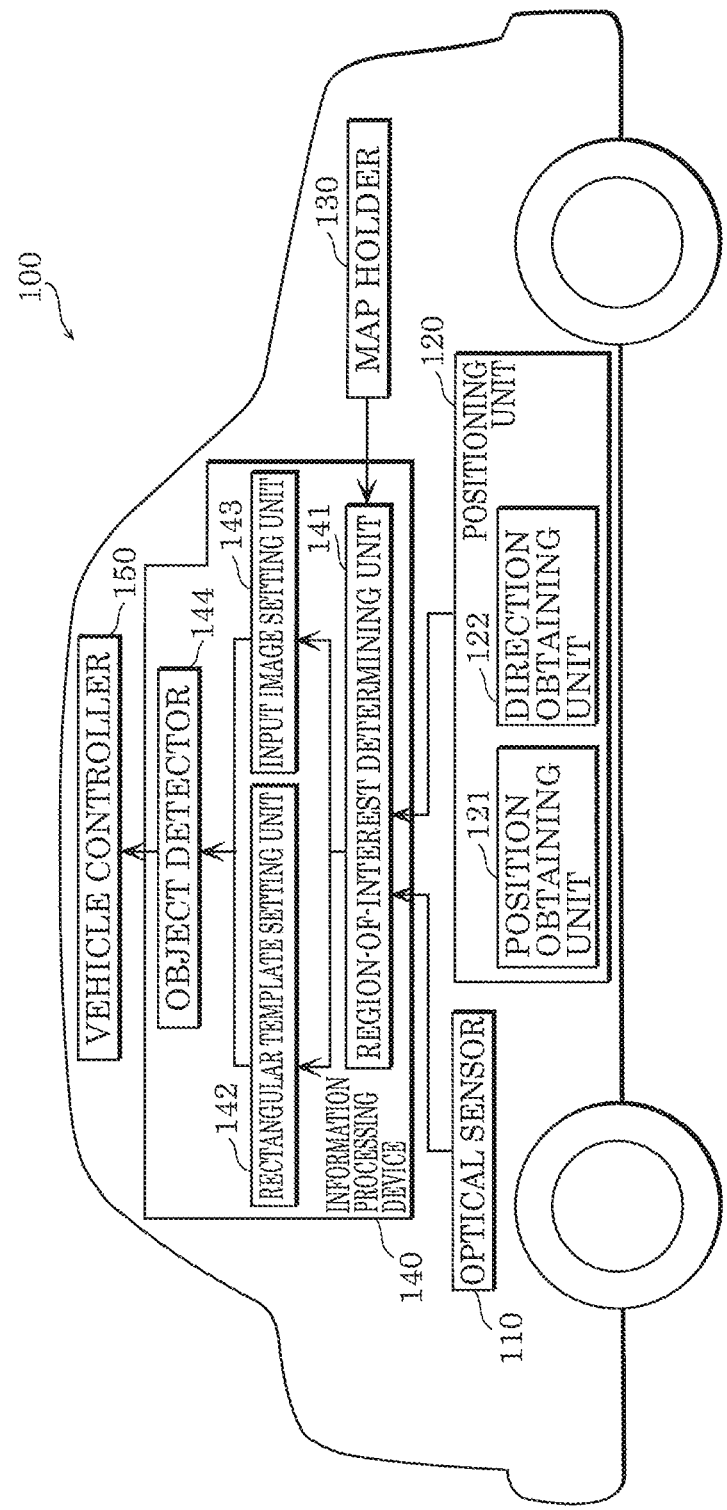
FIG. 1 schematically illustrates a configuration of an information processing device according to Embodiment 1.

Underlying Knowledge Forming Basis of Present Disclosure

As described above, in the conventional technique, an increased amount of calculation resources for object detection may be required. Additionally, when the detection performance of an object detector which uses an artificial intelligence or a pattern matching technique, such as a neural network which is a structural component of a self-driving car (an example of a mobile body) is to be improved, real-time properties of the detection processing may be lost or power consumption may increase. Moreover, since the priority recognition region is limited to the region near the vehicle in the conventional technique, detection performance of people present in a region where no vehicle is present is not necessarily improved.

In contrast, the information processing device according to one aspect of the present disclosure is configured to: obtain sensing data from an optical sensor; obtain position information of an object which includes the optical sensor; obtain map information; determine a specific sensing data region in the sensing data by using the position information and the map information, the specific sensing data region corresponding to a specific region in a sensing region of the optical sensor; and determine, according to the specific sensing data region, input information to be provided to an object detection model, and cause the object detection model to perform object detection processing by using the input information.

Accordingly, since input information to be provided to the object detection model is determined according to the specific sensing data region, the processing amount or the processing details of the object detection model can be controlled according to the specific sensing data region and other regions. As a result, the object detection performance can be improved while reducing an increase in calculation resources required for object detection.

For example, when the specific sensing data region is sidewalk, input of input information appropriate for the sidewalk to the object detection model can improve the detection performance of vulnerable road users such as children and wheelchair users who are more likely to be present on sidewalks than other regions. Moreover, by allocating the calculation resources according to the sidewalks and other regions, an increase in calculation resources required for the object detection processing can be reduced. Accordingly, safety of vulnerable road users can be increased with the limited calculation resources of the information processing device.

Moreover, for example, it may be that, in the object detection processing is narrowed down by using an object rectangular template used for object detection, and that the input information includes the object rectangular template.

Accordingly, since the processing target of the object detection model is narrowed down according to the specific sensing data region, the object detection performance can be improved while reducing an increase in calculation resources required for the processing of the object detection model.

Moreover, for example, it may be that the object rectangular template is set according to an attribute of the specific sensing data region.

Accordingly, the processing target of the object detection model is narrowed down according to the attribute of the specific sensing data region. Here, each kind of object (for example, person, or vehicle) has a typical way of how it is imaged. Moreover, for each attribute of the sensing data regions, different kinds of objects are likely to be present in the sensing data regions. Hence, as in the above configuration, by narrowing down the processing target of the object detection model according to the attribute of the specific sensing data region, both reduction of an increase in calculation resources and improvement of the object detection performance can be effectively achieved.

Moreover, for example, it may be that distance information of the sensing data is obtained, and a size of the object rectangular template is set according to the distance information obtained.

Accordingly, since the sizes of the object rectangular templates can be set according to the distance information, the object detection performance can be further improved while reducing an increase in calculation resources.

Moreover, for example, it may be that the optical sensor includes an image sensor, the sensing data includes a sensing image which is an image obtained from the image sensor, and the input information includes an image in which a resolution in a region other than the specific sensing data region is lower than a resolution in the specific sensing data region, the image being based on the sensing image.

Accordingly, the calculation resources assigned to regions other than the regions of interest can be assigned to the regions of interest. As a result, the object detection performance can be improved while reducing an increase in calculation resources.

Moreover, for example, it may be that the optical sensor includes an image sensor, the sensing data includes a sensing image which is an image obtained from the image sensor, the input information includes a combined image of an image of the specific sensing data region cut out from the sensing image and a whole image which includes both the specific sensing data region and a region other than the specific sensing data region, the combined image being based on the sensing image, and the whole image has a resolution lower than a resolution of an image of the specific sensing data region.

Accordingly, since both an image of the regions of interest and a whole image are input to the object detection model, it is possible to reduce false detection or omission of detection of an object due to cutting out of the regions of interest.

Moreover, for example, an information processing method according to one aspect of the present disclosure is performed by a processor. The information processing method includes: obtaining sensing data from an optical sensor; obtaining position information of an object which includes the optical sensor; obtaining map information; determining a specific sensing data region in the sensing data by using the position information and the map information, the specific sensing data region corresponding to a specific region in a sensing region of the optical sensor;

determining input information to be provided to an object detection model, according to the specific sensing data region; and causing the object detection model to perform object detection processing by using the input information.

Accordingly, since input information to be provided to the object detection model is determined according to the specific sensing data region, the processing amount and the processing details of the object detection model can be controlled according to the specific sensing data region and other regions. As a result, the object detection performance can be improved while reducing an increase in calculation resources required for object detection.

Moreover, for example, a program according to one aspect of the present disclosure may be a program for causing a computer to perform the information processing method describe above.

Accordingly, the computer is capable of performing the information processing method according to the program.

Moreover, these general and specific aspects disclosed above may be implemented using a system, a device, a method, an integrated circuit, a computer program, or a computer-readable non-transitory recording medium such as a CD-ROM, or any combination of systems, devices, methods, integrated circuits, computer programs, or computer-readable recording media.

Hereinafter, embodiments will be specifically described with reference to the drawings. Note that the embodiments described below each show a specific example of the present disclosure. The numerical values, shapes, structural components, steps and the order of the steps, etc., indicated in the following embodiments are mere examples, and therefore do not intend to limit the present disclosure. Among the structural components in the following embodiments, those not recited in any of the independent claims defining the most generic part of the inventive concept are described as optional structural components. Moreover, the embodiments may be combined.

Moreover, the drawings are represented schematically, and are not necessarily precise illustrations.

Moreover, a term, such as "parallel" or "equal", representing a relationship between the structural components, a term, such as "rectangle", representing the shape of a structural component, a numerical value, and a numerical range are used in the present description. Such terms and range are each not representing only a strict meaning of the term or range, but implying that a substantially same range, e.g., a range that includes even a difference as small as a few percentage points, is also included in the term or range.

Embodiment 1

Hereinafter, an information processing device according to the present embodiment will be described with reference to FIG. 1 to FIG. 9.

1-1. Configuration of Information Processing Device

First, a configuration of mobile body 100 which includes information processing device 140 will be described with reference to FIG. 1.

FIG. 1 schematically illustrates a configuration of mobile body 100 which includes information processing device 140 according to the present embodiment. In the present embodiment, mobile body 100 is a vehicle. The vehicle is, for example, a self-driving car which controls driving of the vehicle without requiring an operation by the driver. However, the vehicle may be a vehicle which is capable of traveling by switching between self-driving and manual driving.

As illustrated in FIG. 1, mobile body 100 includes optical sensor 110, positioning unit 120, map holder 130, information processing device 140, and vehicle controller 150. Mobile body 100 is an example of an object which includes optical sensor 110.

Optical sensor 110 is a device which detects a situation surrounding mobile body 100. Optical sensor 110 detects, for example, the positions of other vehicles and pedestrians present around mobile body 100. Optical sensor 110 is realized by a sensor apparatus which generates a captured image generated by capturing an image of the surrounding of mobile body 100, such as a camera including an image sensor or light detection and ranging (LIDAR). Hereinafter, an example will be described where optical sensor 110 is a camera. Optical sensor 110 outputs a captured image (a camera image in the present embodiment) to information processing device 140. The sensor included in mobile body 100 is not limited to an optical sensor. The sensor may be, for example, a sensor which detects temperature, pressure, magnetism, sound, light, gas, ultrasound wave, electromagnetic wave, and the like, and outputs sensing data indicating a detection result. In the case where optical sensor 110 includes an image sensor, the sensing data includes a sensing image which is an image obtained by the image sensor.

Positioning unit 120 measures the position and the direction of mobile body 100. Positioning unit 120 includes position obtaining unit 121 and direction obtaining unit 122.

Position obtaining unit 121 externally obtains the current position of mobile body 100. Position obtaining unit 121 is, for example, realized by a global navigation satellite system (GNSS) receiving apparatus which receives radio waves transmitted from positioning satellite (satellites) such as GNSS.

Direction obtaining unit 122 obtains the direction (for example, the traveling direction) of mobile body 100. Direction obtaining unit 122 includes, for example, a geomagnetic sensor (such as a compass). Direction obtaining unit 122 obtains the direction of mobile body 100 by measuring the direction of mobile body 100 based on the geomagnetism detected by the geomagnetic sensor. The method used by direction obtaining unit 122 for obtaining the direction is not limited to the above method. Direction obtaining unit 122 may include, for example, a gyroscope, and obtain the direction of mobile body 100 by using the angular velocity output by the gyroscope.

Positioning unit 120 outputs the position information indicating the position of mobile body 100 (such as longitude and latitude) and the direction information indicating the direction of travel of mobile body 100 to information processing device 140, by using the information obtained by position obtaining unit 121 and direction obtaining unit 122.

Map holder 130 outputs map information around mobile body 100 to information processing device 140. The map information may be map information held by map holder 130 or map information obtained externally by map holder 130. The map information includes, for example, road information and building information for sites. Note that the map information may be constantly changed by events (such as commuting to and from a neighboring school, occurrence of accidents, or traffic control). For example, the map information may be dynamic map information in which event information variable from hour to hour or real time is associated with so-called static map information. By making the map information dynamic map information, regions of interest to be described later can be set more appropriately.

Information processing device 140 is a device which performs information processing. For example, information processing device 140 is a computer. Information processing device 140 detects objects around mobile body 100 by using various types of information obtained from optical sensor 110, positioning unit 120, and map holder 130, and outputs the detection result. Information processing device 140 is a device which sets inference procedure in object detector 144, and allows a detection result which matches the intention of the user (for example, driver) more to be obtained. As illustrated in FIG. 1, information processing device 140 includes region-of-interest determining unit 141, rectangular template setting unit 142, input image setting unit 143, and object detector 144.

Region-of-interest determining unit 141 determines regions of interest in the sensing data, that is, image obtained from optical sensor 110, based on the position information of mobile body 100 and map information. The regions of interest each are a specific sensing data region in an image. The specific sensing data region corresponds to a specific region (for example, a region to be paid attention to) in the sensing region of optical sensor 110. In the present embodiment, the regions of interest are regions in an image. The regions correspond to sidewalk regions which are specific regions in the sensing region of optical sensor 110. In other words, in the present embodiment, the regions of interest are sidewalk portions in an image. Note that the specific regions are not limited to sidewalks, but are appropriately determined by, for example, traveling route of mobile body 100.

Region-of-interest determining unit 141 obtains an image from optical sensor 110. In other words, region-of-interest determining unit 141 functions as a sensing data obtaining unit which obtains an image from optical sensor 110. Region-of-interest determining unit 141 also obtains map information from map holder 130. In other words, region-of-interest determining unit 141 functions as a map information obtaining unit which obtains map information. Region-of-interest determining unit 141 also obtains position information and direction information from positioning unit 120. In other words, region-of-interest determining unit 141 functions as a position information obtaining unit which obtains position information of mobile body 100 which includes optical sensor 110. Region-of-interest determining unit 141 then obtains road information in the sensing direction of optical sensor 110 from the position information, the direction information, and the map information. Region-of-interest determining unit 141 determines regions of interest (for example, sidewalk portions) which are specific sensing data regions in an image by using the road information. In other words, region-of-interest determining unit 141 functions as a determining unit which determines regions of interest in an image. The present disclosure has a feature in that region-of-interest determining unit 141 determines regions of interest by using map information. Note that the regions of interest are examples of a desirable region. In the following description, an example will be described in which the regions of interest are sidewalks.

Rectangular template setting unit 142 sets parameters of object detector 144 by using the regions of interest, as an example of an object detection parameter setting unit. Specifically, rectangular template setting unit 142 determines object rectangular templates (often referred to as anchor box) to be used by object detector 144, according to the state of the regions of interest in the sensing data that is an image. Rectangular template setting unit 142 outputs, to object detector 144, information related to the object rectangular templates to be used (hereinafter, may also be simply referred to as rectangular templates). Here, the rectangular templates will be described with reference to FIG. 2A and FIG. 2B.

Figure 2A:
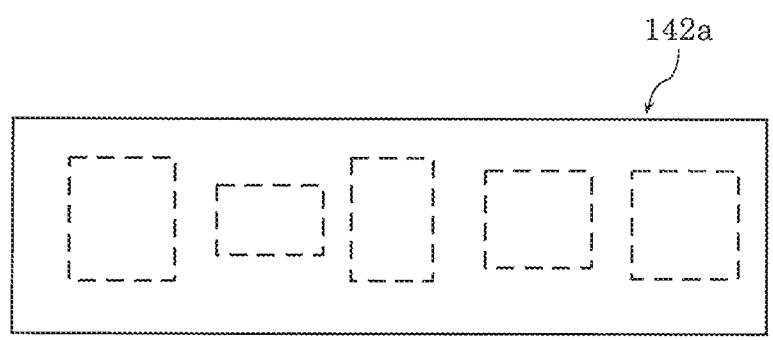
FIG. 2A illustrates an example of a general-purpose rectangular template group according to Embodiment 1.
Figure 2B:
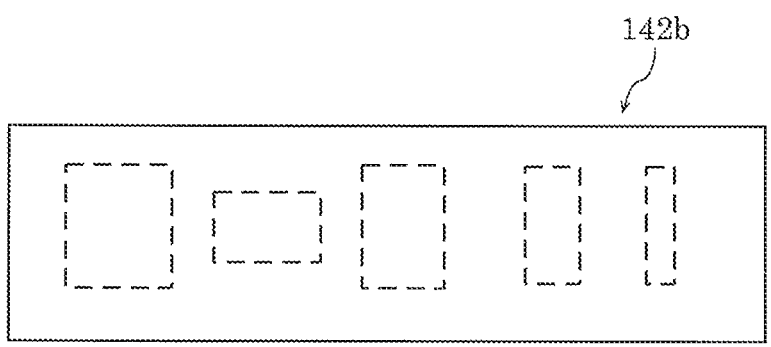
FIG. 2B illustrates an example of a sidewalk rectangular template group according to Embodiment 1.

FIG. 2A illustrates an example of general-purpose rectangular template group 142*a* according to the present embodiment. FIG. 2B illustrates an example of sidewalk rectangular template group 142*b* according to the present embodiment. Sidewalk rectangular template group 142*b* illustrated in FIG. 2B is an example of a region-of-interest rectangular template group. General-purpose rectangular template group 142*a* is, for example, used for detecting objects in regions other than the regions of interest. Sidewalk rectangular template group 142*b* is used for detecting objects in the sidewalk portions which are the regions of interest. Note that the rectangular templates are information of vertical and horizontal aspect ratio. The rectangular templates are calculated by using various algorithms (such as k-means clustering) from dataset (such as image data and annotation data) used for training object detector 144. For example, it may be that object detector 144 learns rectangular templates included in general-purpose rectangular template group 142*a* and sidewalk rectangular template group 142*b*, and that the learned rectangular templates are stored in a storage (not illustrated) included in information processing device 140.

As illustrated in FIG. 2A and FIG. 2B, general-purpose rectangular template group 142*a* and sidewalk rectangular template group 142*b* each include five types of rectangular templates. In this case, rectangular template setting unit 142 outputs, to object detector 144, information indicating that five types of rectangular templates are used as each of general-purpose rectangular template group 142*a* and sidewalk rectangular template group 142*b*.

General-purpose rectangular template group 142*a* includes rectangular templates for detecting objects which exist on the road where mobile body 100 travels. General-purpose rectangular template group 142*a* includes rectangular templates for averagely detecting people, vehicles, bicycles and the like. Sidewalk rectangular template group 142*b* includes rectangular templates which allow people to be detected more easily than general-purpose rectangular template group 142*a*. Sidewalk rectangular template group 142*b* includes rectangular templates for mainly detecting pedestrians, for example. Rectangular templates appropriate for the regions of interest are set to the region-of-interest rectangular template group.

The rectangular templates included in general-purpose rectangular template group 142*a* and sidewalk rectangular template group 142*b* may be partially the same. In FIG. 2A and FIG. 2B, an example is illustrated where three rectangular templates are the same among five rectangular templates. For example, sidewalk rectangular template group 142*b* may include rectangular templates which allow other objects, such as vehicles, to be detected. Accordingly, it is possible to detect a vehicle which exists on the sidewalk, such as a vehicle crossing the sidewalk to enter the road from the parking.

Moreover, the numbers of rectangular templates included in general-purpose rectangular template group 142*a* and sidewalk rectangular template group 142*b* are not limited to the above example. As long as the number of rectangular templates included in general-purpose rectangular template group 142*a* is equal to the number of rectangular templates included in sidewalk rectangular template group 142*b*, the rectangular templates may be four types or less than four types, nine types, twelve types, or greater than twelve types. When there are several types of regions of interest, rectangular template setting unit 142 may set a region-of-interest rectangular template group which includes rectangular templates appropriate for the attribute of each region of interest (for example, sidewalk or road). For example, when the region of interest is sky, the region-of-interest rectangular template group used for the region of interest may include rectangular templates which are appropriate for an air vehicle such as a drone. Accordingly, it is possible to more precisely detect an air vehicle which flies at low altitude. Note that the map information may include air traffic control information such as the flight route of an air vehicle, such as a drone, or holding position of the air vehicle in the sky.

Moreover, rectangular templates may be rectangular templates appropriate for the road where mobile body 100 is traveling. For example, the rectangular templates may be rectangular templates specific to automobiles. Automobiles can be effectively detected by using automobile-specific rectangular templates when mobile body 100 is traveling highway (for example, vehicle platooning).

Referring back to FIG. 1, when regions of interest exist in an image, for example, rectangular template setting unit 142 instructs object detector 144 to use sidewalk rectangular template group 142b illustrated in FIG. 2B relative to the regions of interest in the image. Relative to the regions other than the regions of interest in the image, rectangular template setting unit 142 instructs object detector 144 to use general-purpose rectangular template group 142a illustrated in FIG. 2A.

Input image setting unit 143 outputs, to object detector 144, the processing details to be performed on the image data obtained from region-of-interest determining unit 141. Input image setting unit 143 outputs, to object detector 144, information indicating that processing for cutting out a portion of the image is performed according to the regions of interest, for example. Specifically, when regions of interest exist, input image setting unit 143 instructs object detector 144 to cut out an image including the regions of interest from an original image (for example, a camera image obtained from optical sensor 110), and generate one image (such as a combined image) including the cut out image and the original image, based on preset image size information. In the present embodiment, input image setting unit 143 may provide an instruction to object detector 144, considering that the image obtained from region-of-interest determining unit 141 is an input image. In other words, input image setting unit 143 may output information indicating that the image size is not to be changed to object detector 144. Note that the input image is an image used by object detector 144 for detecting objects. The original image is an example of a whole image.

Object detector 144 detects objects based on, for example, input sensing data that is an image. Object detector 144 is an information processing unit which controls processing performed on an object detection model, and is configured from an electric circuit. The object detection model is a neural network mathematical model (inference machine) having a plurality of layers, and is a mathematical model used for performing object detection processing. Object detector 144 is an example of a model controller.

Fundamentally, an object detection model includes a plurality of processing layers of an input layer, an intermediate layer, and an output layer. The target data of the object detection processing is input to the input layer as input data (input information). From the output layer, processing result data of the object detection processing is output as output data (output information). The input layer and the output layer are different processing layers, and the processing layer between the input layer and the output layer is referred to as an intermediate layer. The object detection model may include a plurality of intermediate layers.

For example, an object detection model learned by using learning data is mounted in object detector 144. Specifically, an object detection model learned by a device different from information processing device 140 may be mounted in object detector 144. Alternatively, by making object detector 144 learn the object detection model mounted in object detector 144 again, the learned object detection model may be mounted in object detector 144.

Specifically, learning data includes input data and correct output data relative to the input data. In learning of an object detection model, input data included in the learning data is input to the input layer of the object detection model. The object detection model is learned by the object detection model being updated so that the output data from the output layer of the object detection model is equivalent to the output data included in the learning data.

For example, object detector 144 inputs, to the input layer of the object detection model, information which is based on the sensing data or the like obtained by region-of-interest determining unit 141. Object detector 144 then performs processing up to the first intermediate layer of the object detection model. The first intermediate layer may be predetermined or may be selected from among a plurality of layers of the object detection model.

Object detector 144 inputs, to a layer subsequent to the first intermediate layer of the object detection model, intermediate input data generated from first intermediate output data or the like from the first intermediate layer. The layer subsequent to the first intermediate layer is, specifically, a layer next to the first intermediate layer. Object detector 144 then performs processing up to the output layer of the object detection model.

Object detector 144 then externally outputs output data (detection result) from the output layer of the object detection model. Object detector 144 may output the detection result to, for example, vehicle controller 150. Accordingly, vehicle controller 150 is capable of controlling an operation of mobile body 100 according to the output data from the output layer of the object detection model. Object detector 144 may cause a display (not illustrated) included in mobile body 100 to display a detection result. Accordingly, it is possible to inform the driver of the detection result.

Moreover, the object detection model may be mounted in another device. Object detector 144 may control input and output of the object detection model, and the other device may perform substantial processing of the object detection model.

Object detector 144 detects objects by using the rectangular templates illustrated in FIG. 2A and FIG. 2B. In the present embodiment, object detector 144 detects objects by using the rectangular templates of both general-purpose rectangular template group 142a and sidewalk rectangular template group 142b. For example, object detector 144 which is capable of changing rectangular templates can be realized by causing object detector 144 to learn all types of rectangular templates to be used for object detection and selecting rectangular templates specified from among all types of learned rectangular templates based on an instruction from rectangular template setting unit 142.

Note that a plurality of structural components of information processing device 140 may be configured from a dedicated hardware, a general-purpose hardware which executes the above program and the like, or any combination of the above. Moreover, the general-purpose hardware may be configured from a memory storing the program, a general-purpose processor which reads the program from the memory and executes the program, and the like. Here, the memory may be a semiconductor memory, a hard disk or the like, and the general-purpose processor may be a CPU or the like. The dedicated hardware may be configured from a memory, a dedicated processor and the like.

Vehicle controller 150 controls an operation (traveling) of mobile body 100 based on the detection result of object detector 144. Vehicle controller 150 may control the operation of mobile body 100 based on the detection result and the map information. Even when the detection result indicates that no pedestrian is detected on the sidewalk, for example, vehicle controller 150 may perform control, such as deaccelerate the speed of mobile body 100, when map information indicates that an event in which people gather is being held near the road where the vehicle is traveling.

In the above description, the example has been described where information processing device 140 includes both rectangular template setting unit 142 and input image setting unit 143. In the present embodiment, however, it is sufficient that information processing device 140 includes at least rectangular template setting unit 142.

As described above, information processing device 140 includes: a sensing data obtaining unit which obtains image P1 (an example of sensing data) from optical sensor 110; a position information obtaining unit which obtains position information of mobile body 100 (an example of an object) which includes optical sensor 110; a map information obtaining unit which obtains map information; region-of-interest determining unit 141 (an example of a determining unit) which determines regions of interest (an example of a specific sensing data region) in image P1 which correspond to sidewalk regions (an example of a specific region) in the sensing region of optical sensor 110 by using the position information and the map information; and object detector 144 (an example of a model controller) which determines input information to be provided to an object detection model according to the regions of interest, and causing the object detection model to perform object detection processing by using the input information. Note that region-of-interest determining unit 141 has functions of the sensing data obtaining unit, the position information obtaining unit, and the map information obtaining unit.

1-2. Operation of Information Processing Device

Next, an operation of information processing device 140 will be described with reference to FIG. 3 to FIG. 9.

Figure 3:
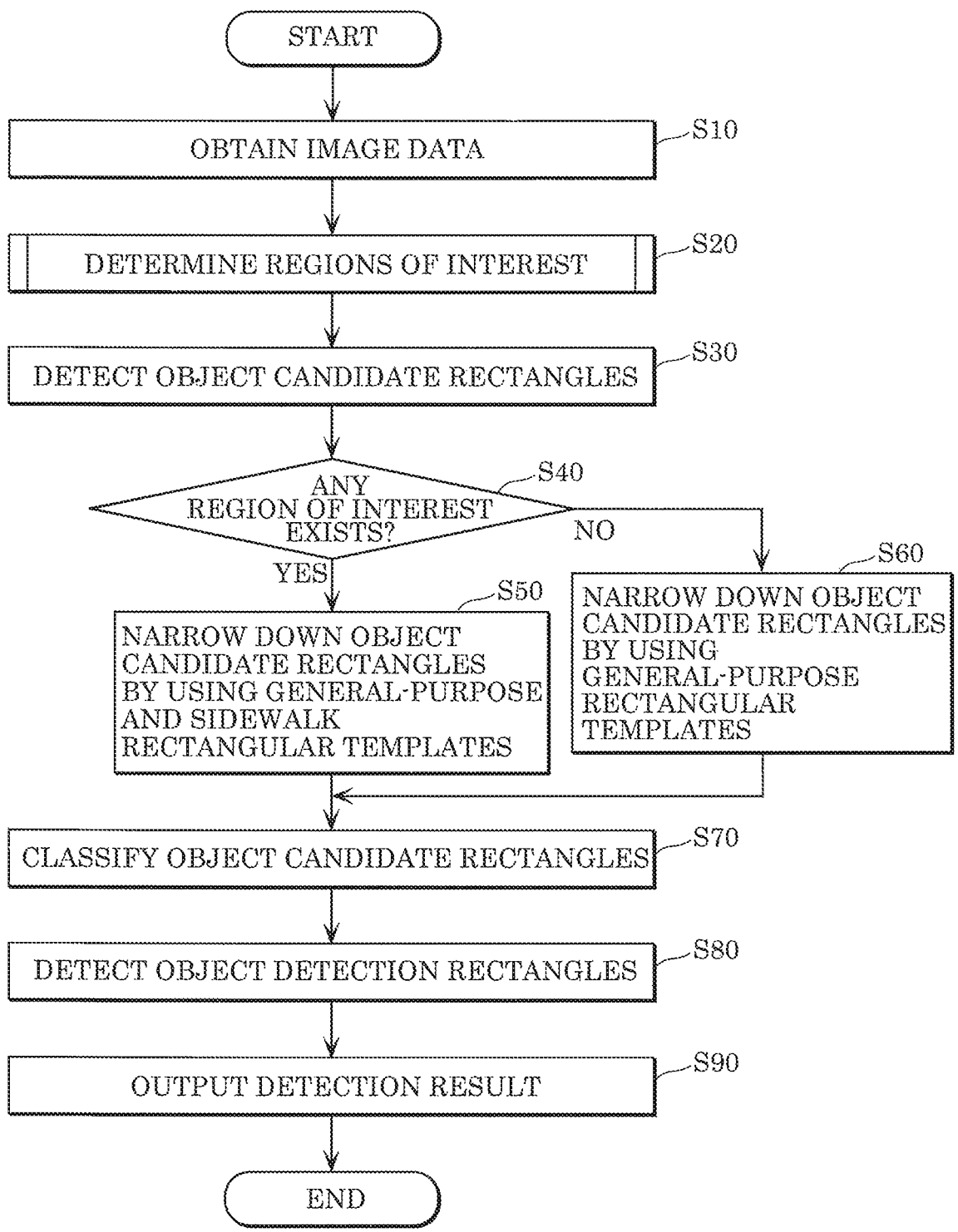
FIG. 3 is a flowchart of an example of an operation of the information processing device according to Embodiment 1.

FIG. 3 is a flowchart of an example of an operation of information processing device 140 according to the present embodiment.

Figure 5:
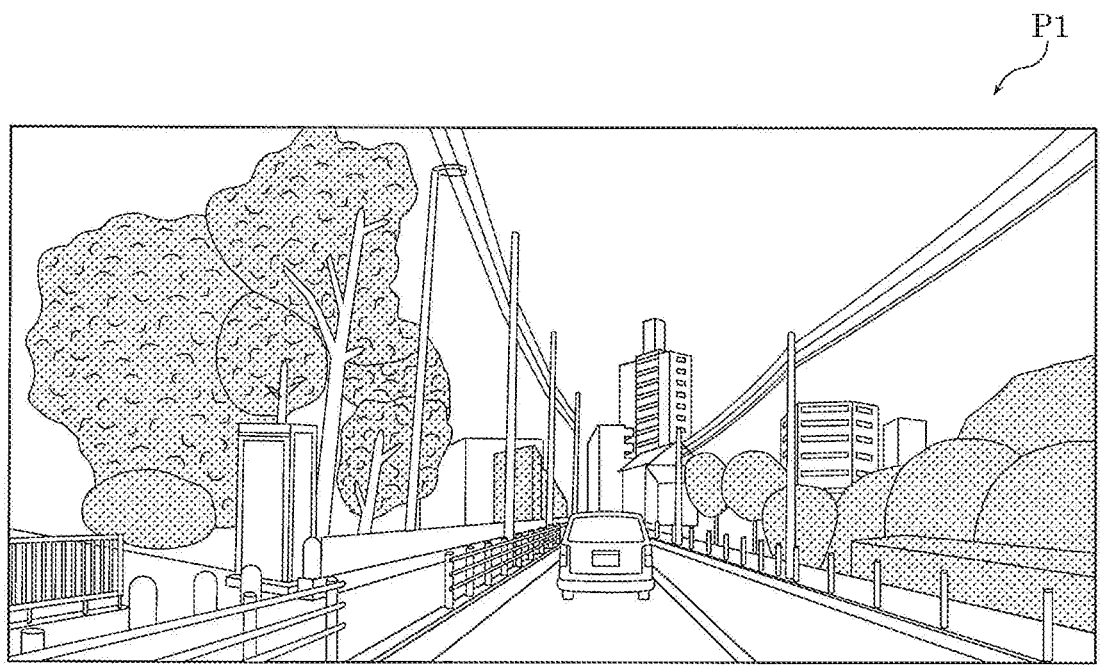
FIG. 5 illustrates an example of an image obtained by the region-of-interest determining unit according to Embodiment 1.

As illustrated in FIG. 3, first, information processing device 140 obtains image data from optical sensor 110 (S10). Specifically, region-of-interest determining unit 141 obtains image data. FIG. 5 illustrates an example of image P1 obtained by region-of-interest determining unit 141 according to the present embodiment. For example, region-of-interest determining unit 141 obtains image P1 indicated by the image data. Note that the range in which image P1 illustrated in FIG. 5 is captured is an example of a sensing region. Image P1 is an example of sensing data obtained from optical sensor 110. When optical sensor 110 is LIDAR, the range to which laser is emitted is an example of a sensing region.

Next, information processing device 140 determines regions of interest in image P1 from the map information and positioning information (S20). Specifically, region-of-interest determining unit 141 determines regions of interest. Here, an operation performed by region-of-interest determining unit 141 for determining regions of interest will be described with reference to FIG. 4 to FIG. 7.

Figure 4:
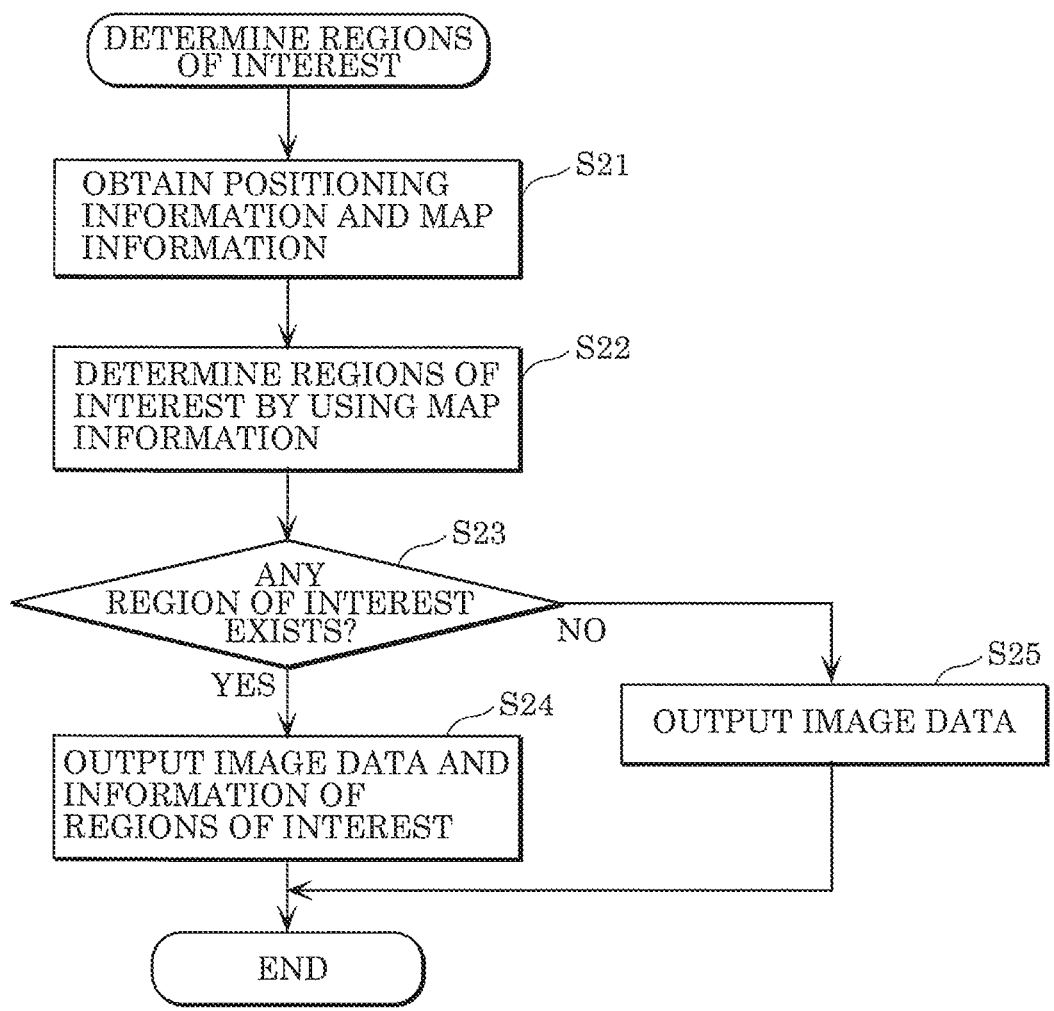
FIG. 4 is a flowchart of an example of an operation of a region-of-interest determining unit according to Embodiment 1.

FIG. 4 is a flowchart of an example of an operation of region-of-interest determining unit 141 according to the present embodiment.

As illustrated in FIG. 4, region-of-interest determining unit 141 first obtains positioning information and map information (S21). Specifically, region-of-interest determining unit 141 obtains, from positioning unit 120, positioning information including the position and the direction (traveling direction) of mobile body 100 as positioning information, and obtains map information from map holder 130.

Figure 6:
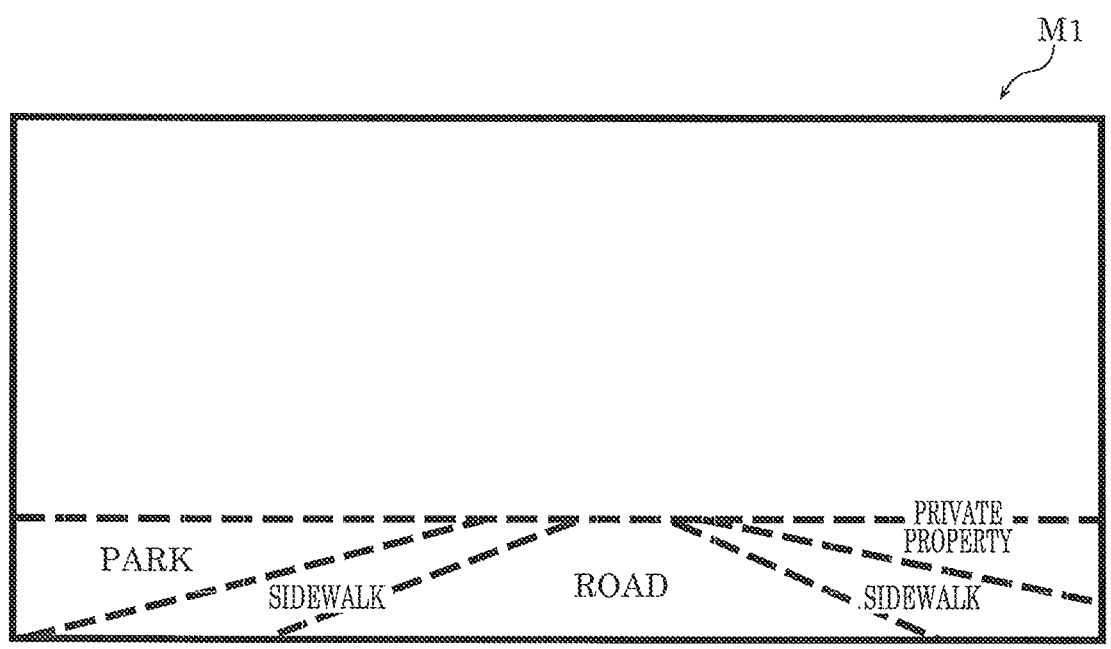
FIG. 6 illustrates an example of map information obtained by the region-of-interest determining unit according to Embodiment 1.

FIG. 6 illustrates an example of map information M1 obtained by region-of-interest determining unit 141 according to the present embodiment. Map information M1 is information corresponding to image P1. For example, as illustrated in FIG. 6, respective regions in an image are determined from map information M1 and positioning information. Note that "road", "sidewalk", "park", and "private property" illustrated in FIG. 6 are examples of the attributes of the regions of interest. The respective regions may be determined by using region division method (for example, semantic segmentation) instead of the above method or along with the above method.

Region-of-interest determining unit 141 then determines regions of interest by using map information M1 (S22). Specifically, region-of-interest determining unit 141 identifies the positions of the regions of interest in image P1 (for example, coordinate data) by using map information M1. In the present embodiment, for example, when region-of-interest determining unit 141 obtains image P1 as illustrated in FIG. 5, region-of-interest determining unit 141 determines, as regions of interest, the sidewalk portions in image P1, by using the road information included in map information M1 corresponding to image P1.

Figure 7:
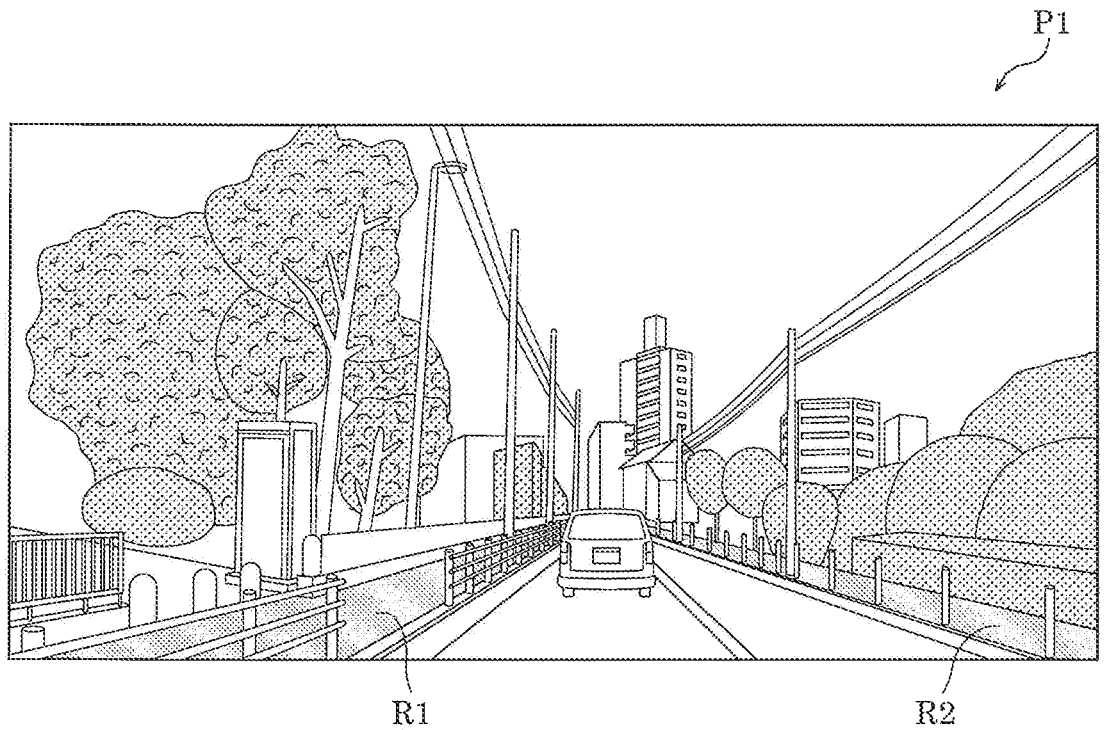
FIG. 7 is a diagram in which regions of interest are overlaid on the image illustrated in FIG. 5.

FIG. 7 is a diagram in which regions of interest are overlaid on image P1 illustrated in FIG. 5. The regions of interest in image P1 in FIG. 7 are sidewalk portions R1 and R2. Note that as illustrated in FIG. 7, the regions of interest (sidewalk portions R1 and R2) are not written on image P1 itself, but it is treated as image P1 and coordinate data of the regions of interest associated with image P1.

Referring back to FIG. 4, next, it is determined whether or not any region of interest exists in image P1 (S23). When regions of interest exist (Yes in S23), region-of-interest determining unit 141 outputs image data corresponding to image P1 and information of regions of interest to rectangular template setting unit 142 and input image setting unit 143 (S24). For example, region-of-interest determining unit 141 may output information of the regions of interest to rectangular template setting unit 142, and output the image data and the information of the regions of interest to input image setting unit 143. The information of the regions of interest include, for example, coordinate data of the regions of interest associated with image P1. The information of the regions of interest may include the attribute of the regions of interest. When there is one type of region of interest, the information of the region of interest output to rectangular template setting unit 142 does not have to include the coordinate data of the region of interest as long as information indicating the existence of the region of interest is included.

When there is no region of interest (No in S23), region-of-interest determining unit 141 outputs image data to input image setting unit 143 (S25). When No in S23, region-of-interest determining unit 141 may output, to rectangular template setting unit 142, information indicating that there is no region of interest.

When rectangular template setting unit 142 obtains information of the regions of interest, rectangular template setting unit 142 outputs information of the rectangular templates to be used to object detector 144, so that the rectangular templates appropriate for the obtained information of the regions of interest (for example, rectangular templates included in at least one of general-purpose rectangular template group 142*a* and sidewalk rectangular template group 142*b*) is used. When input image setting unit 143 obtains image data and information of the regions of interest, input image setting unit 143 outputs the obtained image data and information of the regions of interest to object detector 144.

Referring back to FIG. 3, processing subsequent to step S30 is performed. The processing subsequent to step S30 is performed by object detector 144. For example, processing in steps S30 to S80 is performed by object detector 144 inputting, to an object detection model, input information including the input image and rectangular templates for object detection. In the present embodiment, the detection result of object detector 144 is described as detection rectangles, but the detection result is not limited to rectangle regions. The detection result may be, for example, polygonal regions. Note that steps S30 to S80 are examples of the step of causing the object detection model to perform object detection processing.

Object detector 144 may perform predetermined image processing on image data obtained from input image setting, unit 143 (the camera image captured by optical sensor 110) between step S20 and step S30. Object detector 144 may perform, processing in which the image data is changed to an image having a resolution used for object detection. Object detector 144 may perform processing for shrinking the image size to reduce the processing amount, for example. Note that this processing may be performed, for example, based on an instruction from input image setting unit 143. The image having a changed resolution is an example of an input image. Moreover, this processing does not have to be performed. In this case, the image obtained from input image setting unit 143 is an example of an input image.

Object detector 144 then detects object candidate rectangles from the input image (S30). Object detector 144 selects candidate regions by grouping similar regions on a per pixel unit, for example. In other words, object detector 144 combines regions with similar features and extracts the combined region as one object candidate. Specifically, object detector 144 combines regions with similar features and extracts one object candidate as an object candidate rectangle. Object detector 144 extracts object candidates as rectangle information from the input image. Object detector 144 extracts, for example, tens of thousands of object candidate rectangles from one input image.

Next, when regions of interest exist (Yes in S40), object detector 144 narrows down object candidate rectangles by using general-purpose rectangular template group 142*a* and sidewalk rectangular template group 142*b* (S50). In other words, object detector 144 suggests object candidate rectangles by using general-purpose rectangular template group 142*a* and sidewalk rectangular template group 142*b*. Here, the suggestion of object candidate rectangles refers to extraction of object candidate rectangles on which object detection processing is to be performed from among the object candidate rectangles detected in step S30, by using rectangular templates. In other words, suggestion of object candidate rectangles refers to extraction of targets of processing subsequent to step S70 from among the object candidate rectangles detected in step S30. Suggestion of the object candidate rectangles is processing in which object candidate rectangles which are more likely to be desirable objects are extracted from among the object candidate group by inferring object candidates by the rectangular templates scaled relative to the central coordinate of the object candidate. Specifically, in step S50, object candidate rectangles whose size and aspect ratio are close to those of the rectangular templates are extracted.

Object detector 144 extracts object candidate rectangles by using sidewalk rectangular template group 142*b*, relative to sidewalk portions R1 and R2 which are regions of interest. In other words, relative to sidewalk portions R1 and R2 which are regions of interest, sidewalk rectangular template group 142*b* which allows people to be easily detected is used to more precisely detect pedestrians. Among a plurality of object candidate rectangles, when at least a portion of the coordinate data of the object candidate rectangles includes the coordinate data of sidewalk portions R1 and R2, the object candidate rectangles are extracted by using sidewalk rectangular template group 142*b*.

Object detector 144 extracts object candidate rectangles by using general-purpose rectangular template group 142*a*, relative to regions which are not regions of interest (for example, regions other than sidewalk portions R1 and R2). In other words, relative to the regions which are not regions of interest, general-purpose rectangular template group 142*a* which allows more variety of objects to be easily detected than sidewalk rectangular template group 142*b* is used to averagely detect pedestrians, vehicles, and the like.

Object detector 144 selects, based on an instruction from rectangular template setting unit 142, rectangular templates to be used for sidewalk portions R1 and R2 and rectangular templates to be used for other regions.

Object detector 144 extracts several thousands of object candidate rectangles (for example, two thousands) from several tens of thousands of object candidate rectangles (for example, ten thousand) in step S50. In step S50, the number of extracted object candidate rectangles is not necessarily limited to several thousands. For example, it is sufficient that the number of object candidate rectangles is narrowed down to the number which allows object detector 144 to perform object detection processing at a predetermined processing speed. The predetermined processing speed refers to a processing speed which poses no safety risk in self-driving, and is, for example, 30 fps (frame per second).

When no region of interest exists (No in S40), object detector 144 narrows down the object candidate rectangles by using general-purpose rectangular template group 142*a* (S60).

Next, object detector 144 classifies the extracted object candidate rectangles (S70). Specifically, object detector 144 infers the reliability for assumed classes (such as people, vehicle, or automobile) relative to the extracted object candidate rectangles, and classifies the object candidate rectangles. Relative to the object candidate rectangles which exist in sidewalk portions R1 and R2, object detector 144 infers the reliability of each object candidate rectangle by using sidewalk rectangular template group 142*b* and classifies the object candidate rectangles. Examples of inference of reliability include calculation of possibility (such as probability) for each assumed class. Classification refers to, for example, calculation of probability for each assumed class made such that the total of all assumed classes is 100% from the inference result of the reliability. Object detector 144 performs classification, for example, such that the total is 100% including people 60%, vehicle 25%, and bicycle 15%. Relative to the object candidate rectangles which exist in the regions other than sidewalk portions R1 and R2, object detector 144 infers the reliability of each object candidate rectangle by using general-purpose rectangular template group 142a and classifies the object candidate rectangles.

Object detector 144 then performs threshold value processing on the reliabilities of the object candidate rectangles, and detects object detection rectangles (S80). In other words, object detector 144 determines, as object detection rectangles, rectangles each having a reliability greater than or equal to a predetermined threshold value from among object candidate rectangles. In the above example, when the predetermined threshold value is 50%, an object candidate indicated by an object candidate rectangle is detected as a person. The predetermined threshold value is not limited to 50%, but may be, for example, set to a value greater than or equal to 50%.

Figure 8:
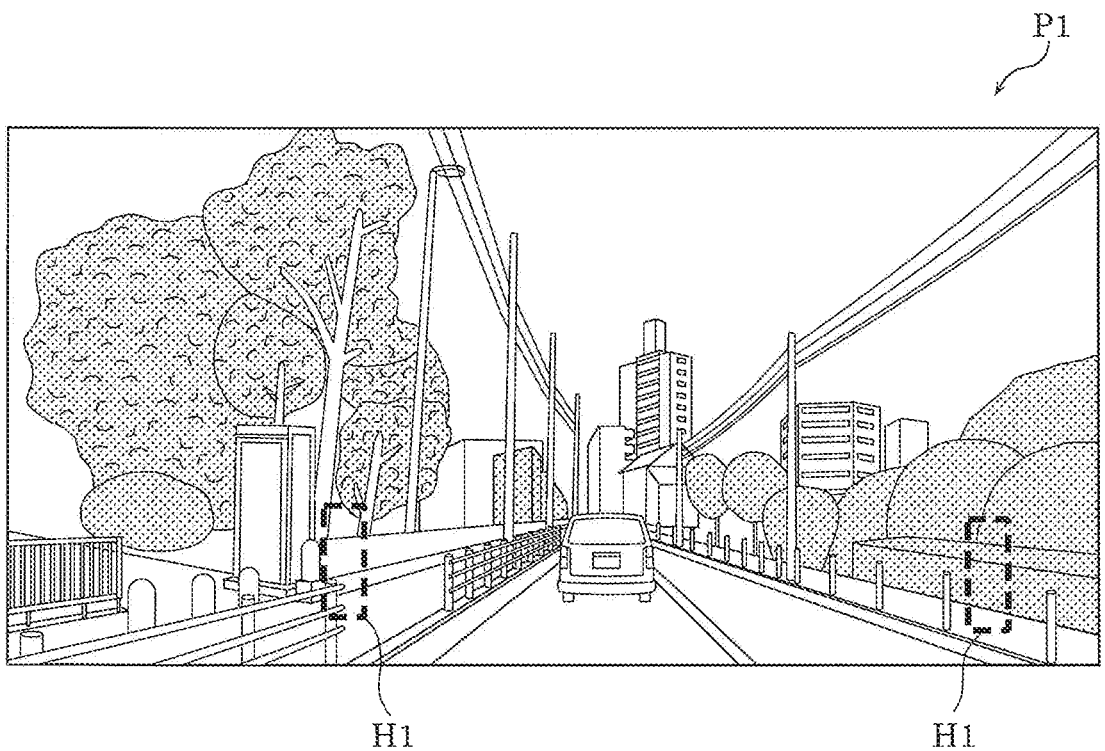
FIG. 8 is a drawing in which a detection result is overlaid on an image, according to Embodiment 1.

Object detector 144 then outputs a detection result (S90). Object detector 144 performs processing for applying an object detection rectangle to an original camera image (for example, image P1), for example, and outputs the processed camera image. Object detector 144 outputs image P1 illustrated in FIG. 8, for example. FIG. 8 is a diagram in which the detection result is overlaid on image P1, according to the present embodiment.

As illustrated in FIG. 8, as processing applied to image P1 (camera image), processing is performed in which object detection rectangles H1 are overlaid on image P1. Object detector 144 may display image P1 in FIG. 8 on, for example, a display included in mobile body 100.

In the present embodiment, the number of rectangular templates included in general-purpose rectangular template group 142a is the same as the number of rectangular templates included in sidewalk rectangular template group 142b. Accordingly, the processing amount of object detector 144 in steps S50, S70, and S80 is equivalent to the processing amount of object detector 144 in steps S60, S70, and S80.

Figure 9:
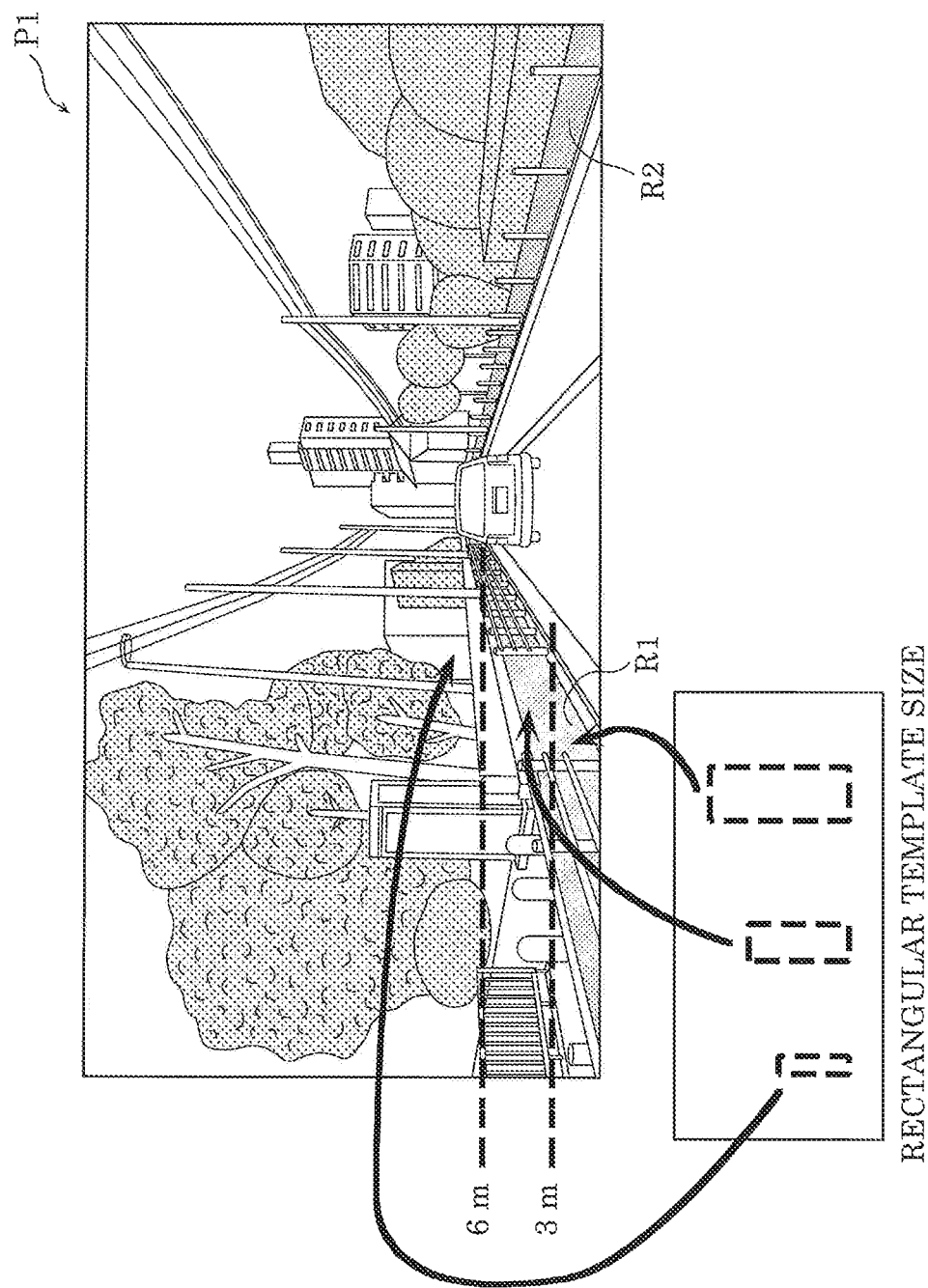
FIG. 9 is a drawing in which distance information is overlaid on an image, according to Embodiment 1.

In the above embodiment, the example has been described where the range of scaling of rectangular templates used for processing for object candidate suggestion from among the object candidate group is not limited in theory. However, the present disclosure is not limited to such an example. Specifically the range of scaling of rectangular templates relative to the object candidate group may be dynamically set according to the distance from optical sensor 110. For example, when the distance can be measured from map information M1 (for example, the distance from optical sensor 110) as illustrated in FIG. 9, object detector 144 may change the range of scaling of rectangular templates to be used for the object candidate rectangle suggestion by using the measured distance. For example, object detector 144 sets the sizes of the object rectangular templates according to the distance information obtained from the map information. Here, setting of the size refers to changing of the size without changing the aspect ratio of the rectangular template. Moreover, the distance information does not necessarily have to be obtained from map information. The distance information may be obtained from various types of sensors included in mobile body 100, for example. For example, when optical sensor 110 is implemented by LIDAR, the distance information may be information obtained by optical sensor 110. FIG. 9 is a drawing in which distance information is overlaid on the image data according to the present embodiment.

As illustrated in FIG. 9, the maximum scaling value may be set according to the measured distance. When the distance from optical sensor 110 is 3 m, scaling with a greater maximum value than the case where the distance is 6 m may be used.

Moreover, for example, a dedicated processor may perform the above information processing method by referring to a memory which stores information of the object detection model.

When an object detection model is a neural network inference machine, the detection neural network may be switched according to at least one of the number of regions of interest and the aspect ratio of the regions of interest.

As described above, information processing device 140 according to the present embodiment includes region-of-interest determining unit 141 and object detector 144. Region-of-interest determining unit 141 obtains image P1 captured by optical sensor 110, position information of mobile body 100 which includes optical sensor 110, and map information. Region-of-interest determining unit 141 determines regions of interest in image P1 by using the position information and the map information. Object detector 144 determines, according to the regions of interest, the input information to be provided to an object detection model, and causes the object detection model to perform object detection processing by using the input information. In other words, information processing device 140 according to the present embodiment, for example: obtains image P1 (an example of sensing data) from optical sensor 110; obtains position information of mobile body 100 (an example of an object) which includes optical sensor 110; obtains map information; determines regions of interest (an example of a specific sensing data region) in image P1 which corresponds to sidewalk regions (an example of a specific region) in a range in which image P1 is captured (an example of a sensing region of optical sensor 110) by using the obtained position information and map information; determines, according to the regions of interest, input information to be provided to an object detection model; and causes the object detection model to perform object detection processing by using the input information.

With this configuration, the input information to be provided to the object detection model is determined according to the regions of interest. In the present embodiment, rectangular templates input to the object detection model are determined according to the regions of interest. The object detection performance of the object detection model in the regions of interest is improved by performing object detection processing by using the rectangular templates appropriate for the regions of interest. As a result, the object detection performance can be improved while reducing an increase in calculation resources required for object detection. Moreover, since an increase in processing amount of object detector 144 is reduced, it is possible to reduce a reduction in real-time properties of real time object detection in an image used in a self-driving car and occurrence of an increase in power consumption.

Embodiment 2

Hereinafter, an information processing device according to the present embodiment will be described with reference to FIG. 10 to FIG. 13B. Since the configuration of the information processing device according to the present embodiment is similar to the configuration of information processing device 140 according to Embodiment 1, the description thereof is omitted. In the present embodiment, it is sufficient that information processing device 140 includes at least input image setting unit 143 among rectangular template setting unit 142 and input image setting unit 143. Description of the processing similar to that of information processing device 140 according to Embodiment 1 may be omitted or simplified below.

2-1. Operation of Information Processing Device

Figure 10:
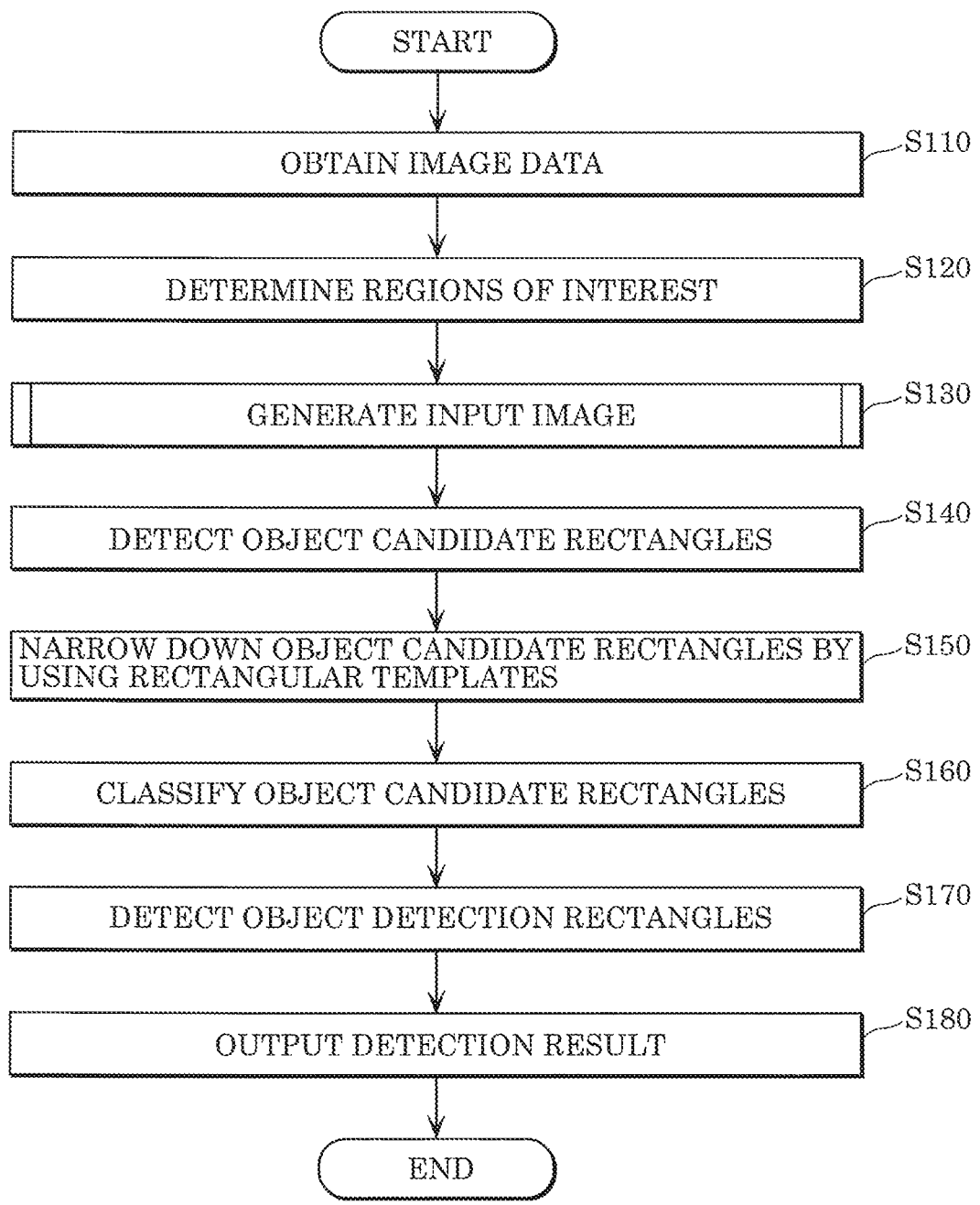
FIG. 10 is a flowchart of an example of an operation of an information processing device according to Embodiment 2.

An operation of information processing device 140 according to the present embodiment will be described with reference to FIG. 10 to FIG. 13B. FIG. 10 is a flowchart of an example of an operation of an information processing device according to the present embodiment.

As illustrated in FIG. 10, information processing device 140 first obtains image data from optical sensor 110 (S110). Since step S110 is similar to step S10 in FIG. 3 in Embodiment 1, the description thereof is omitted.

Next, information processing device 140 determines regions of interest in an image from map information and positioning information (S120). Specifically, region-of-interest determining unit 141 determines regions of interest. Since the operation performed by region-of-interest determining unit 141 for determining regions of interest is similar to step S20 in FIG. 3 in Embodiment 1 (specifically, steps S21 to S25 in FIG. 4), the description thereof is omitted.

Rectangular template setting unit 142 outputs information of rectangular templates to be used to object detector 144 so that predetermined rectangular templates (predetermined rectangular templates such as general-purpose rectangular template group 142a) are used, regardless of whether or not image P1 includes regions of interest. When rectangular template setting unit 142 obtains information of the regions of interest, rectangular template setting unit 142 may output information of the rectangular templates to be used to object detector 144 so that the rectangular templates appropriate for the information of the regions of interest obtained (for example, at least one of general-purpose rectangular template group 142a and sidewalk rectangular template group 142b) is used. Hereinafter, an example will be described where rectangular template setting unit 142 instructs object detector 144 to use general-purpose rectangular template group 142a, regardless of whether or not image P1 includes regions of interest.

Input image setting unit 143 instructs object detector 144 to cut out rectangles including the sidewalk portions which are regions of interest, and generate an input image in which a whole region of the image and the regions of interest are combined.

Object detector 144 generates an input image based on an instruction from input image setting unit 143 (S130). Object detector 144 generates an input image by performing predetermined image processing on image P1. The image processing in step S130 incudes processing for shrinking the image size to reduce the processing amount of object detector 144. The processing subsequent to step S130 is performed by object detector 144.

Figure 11:
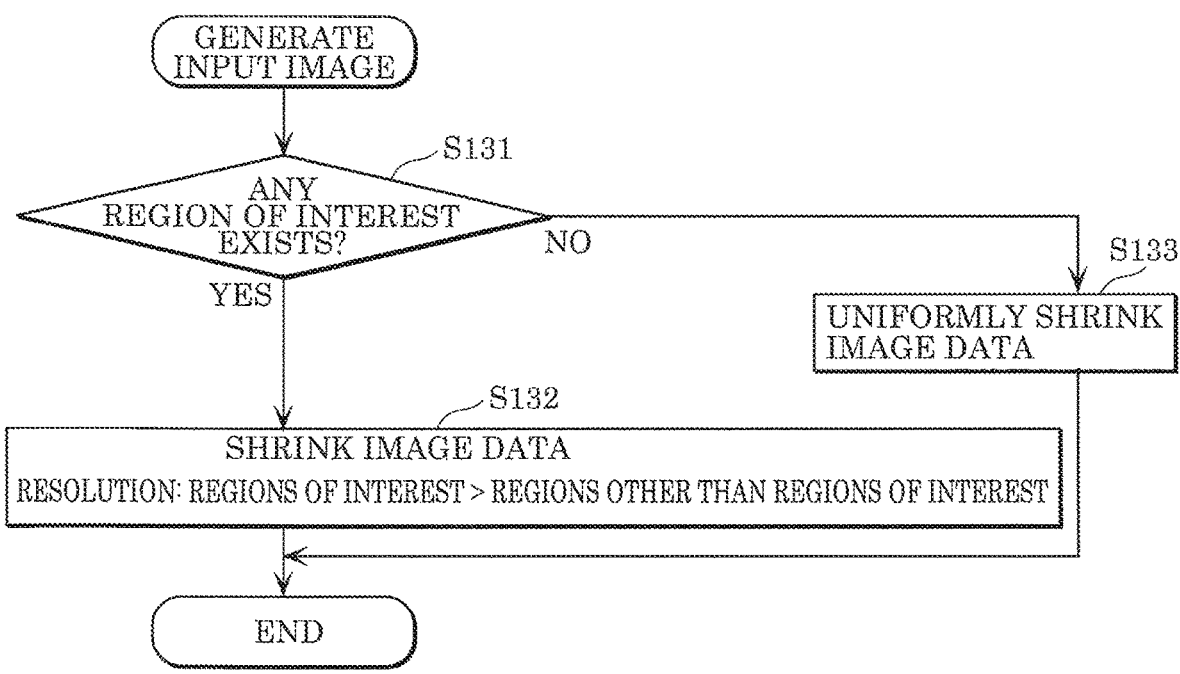
FIG. 11 is a flowchart of an operation performed by an object detector for generating an input image, according to Embodiment 2.

Here, generation of an input image by object detector 144 will be described with reference to FIG. 11. FIG. 11 is a flowchart of an operation performed by object detector 144 for generating an input image, according to the present embodiment.

As illustrated in FIG. 11, when regions of interest exist in an image (Yes in S131), processing for shrinking image data (image) is performed (S132). In step S132, the regions of interest included in the image (the sidewalk portions in the present embodiment) and the regions other than the regions of interest (hereinafter, may also be referred to as other regions) are shrunk at different shrinkage rates. Object detector 144 may, for example, shrink the regions of interest included in the image and the whole region including the regions of interest and other regions at different shrinkage rates. Specifically, object detector 144 sets the shrinkage rate of the regions of interest to be less than the shrinkage rate of the whole region or other regions.

Figure 12A:
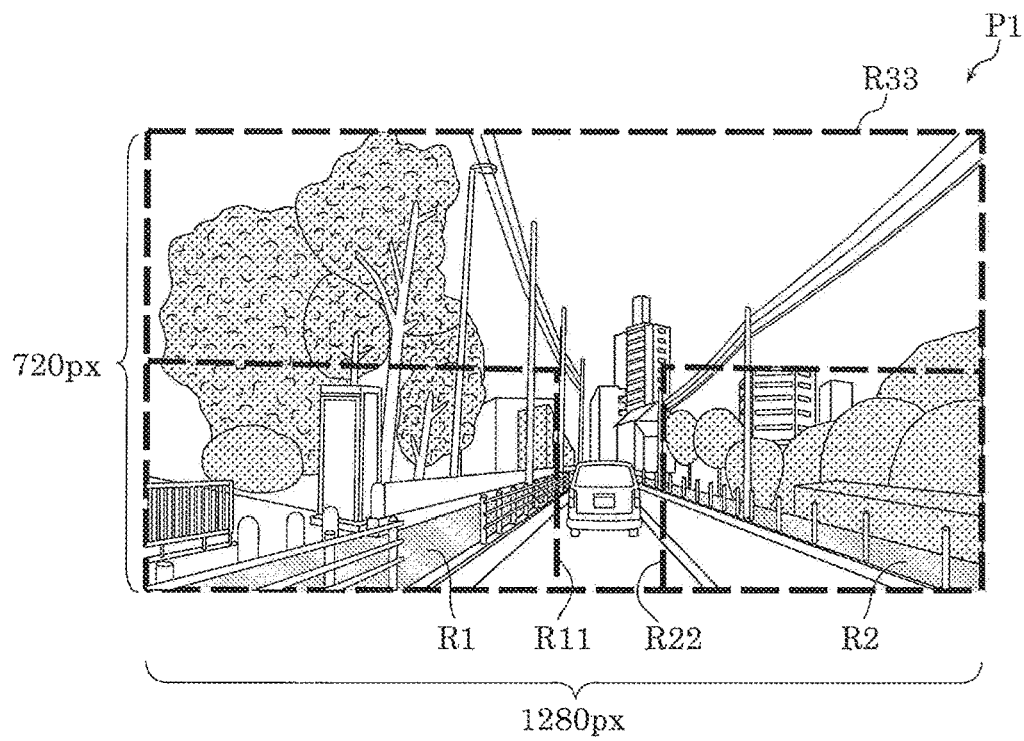
FIG. 12A illustrates an image before being shrunk when regions of interest are included in the image, according to Embodiment 2.
Figure 12B:
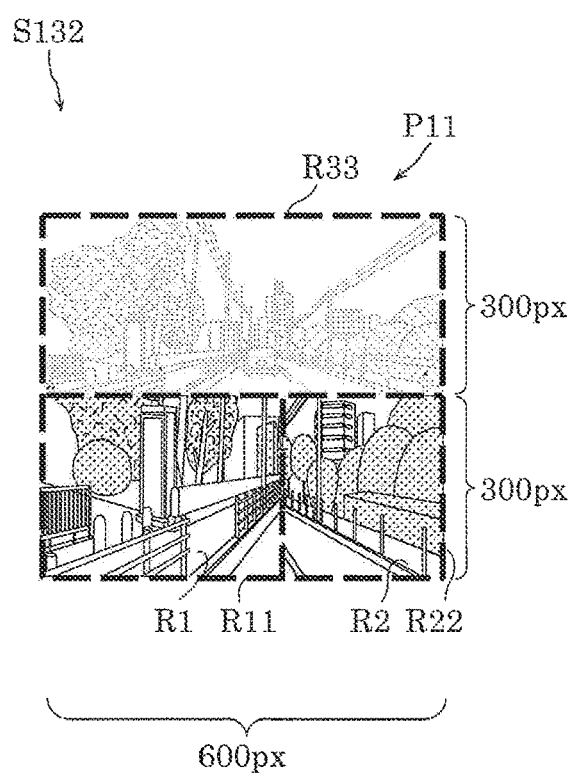
FIG. 12B illustrates an image after being shrunk when the regions of interest are included in the image, according to Embodiment 2.

Image processing in step S132 will be described with reference to FIG. 12A and FIG. 12B. FIG. 12A illustrates image P1 which is before being shrunk when regions of interest are included in image P1, according to the present embodiment. FIG. 12B illustrates image P11 after being shrunk when regions of interest are included in image P11, according to the present embodiment. Image P11 is an example of an input image. FIG. 12A and FIG. 12B illustrate examples where image P1 with an image size of 1280 pixels×720 pixels is shrunk to image P11 with an image size of 600 pixels×600 pixels. In step S130, the image size is reszed by generating image P11 in FIG. 12B from image P1 in FIG. 12A.

As illustrated in FIG. 12A and FIG. 12B, object detector 144 cuts out cutout region R11 including sidewalk portion R1 which is a region of interest and cutout region R22 including sidewalk portion R2 which is a region of interest from image P1, and generates image P11 from cutout regions R11 and R22 and whole region R33 (for example, image P1) including cutout regions R11 and R22. In other words, image P11 is a combined image of an image including the regions of interest (cutout regions R11 and R22) and an image of whole region R33. The shape of cutout region R11 is not limited to rectangle as long as sidewalk portion R1 is included. For example, the shape of cutout region R11 may be polygonal. The shape of cutout region R22 is not limited to rectangle as long as sidewalk portion R2 is included. For example, cutout region R22 may be polygonal. Note that whole region R33 is an example of a sensing region.

Object detector 144, for example, shrinks whole region R33 to the image size of 600 pixels×300 pixels, and shrinks cutout regions R11 and R22 to the image size of 600 pixels×300 pixels. The image sizes are not limited to the above sizes as long as the shrinkage rates of cutout regions R11 and R22 are less than the shrinkage rate of whole region R33. Moreover, the image size may be determined so that the shrinkages rates of cutout regions R11 and R22 are less than the shrinkage rate of whole region R33. The portion which indicates whole region R33 in image P11 as described above has a resolution lower than the portions indicating cutout regions R11 and R22. In other words, the region-of-interest portions each have an image quality greater than other regions. An image, which includes both cutout region R11 and R22 (an example of a specific sensing data region) and regions other than cutout regions R11 and R22, is an example of a whole image. For example, the image of whole region R33 is an example of a whole image.

The image size of image P11 is equal to the image size of an image (for example, image P22 in FIG. 13B) obtained by shrinking image P1 when no region of interest exists in image P1.

Referring back to FIG. 11, when no region of interest exists in image P1 (No in S131), processing for uniformly shrinking the image data is performed (S133). In step S133, the image data is shrunk at a uniform shrinkage rate.

Figure 13A:
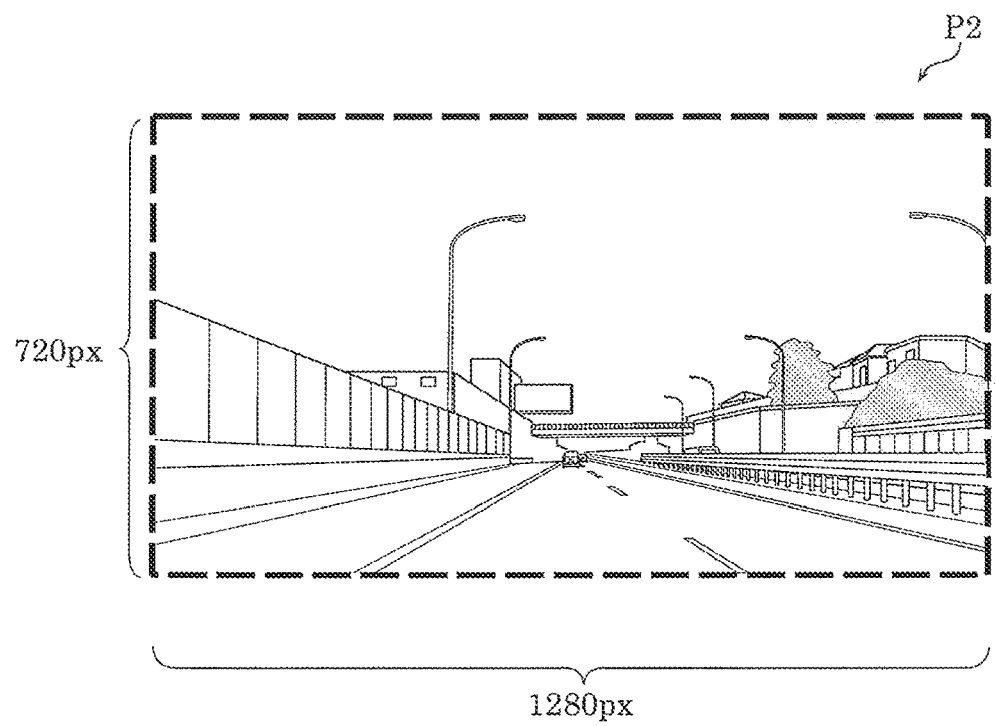
FIG. 13A illustrates an image before being shrunk when no region of interest is included in the image, according to Embodiment 2.
Figure 13B:
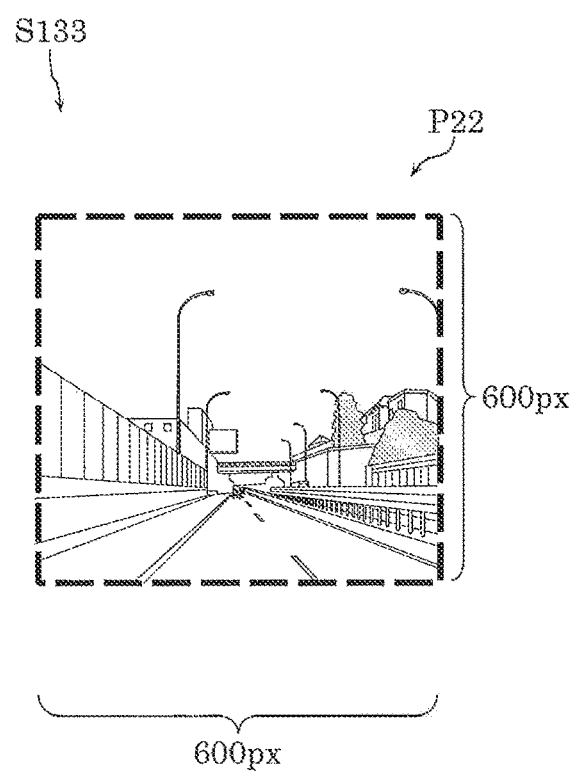
FIG. 13B illustrates an image after being shrunk when no region of interest is included in the image, according to Embodiment 2.

Image processing in step S133 will be described with reference to FIG. 13A and FIG. 13B. FIG. 13A illustrates image P2 before being shrunk when no region of interest is included, according to the present embodiment. FIG. 13B illustrates image P22 after being shrunk when no region of interest is included, according to the present embodiment. Image P22 is an example of an input image. FIG. 13A and FIG. 13B illustrate an example where image P2 with the image size of 1280 pixels×720 pixels is changed to image P22 with the image size of 600 pixels×600 pixels. Note that the range in which image P2 illustrated in FIG. 13A is captured is an example of a sensing region.

As illustrated in FIG. 13A and FIG. 13B, object detector 144 generates image P22 by entirely shrinking image P2. Image P22 has a uniform image quality in whole.

Referring back to FIG. 11, processing subsequent to step S140 is performed. The processing subsequent to step S140 is performed by object detector 144. For example, processing in steps S140 to S170 is performed by object detector 144 inputting, to an object detection model, input information including the input image and rectangular templates for object detection. In the present embodiment, an input image has features. Object detector 144 generates an image (for example, image P11) in which the resolution is different between the regions of interest and the regions other than the regions of interest, and inputs the image to the object detection model as an input image. The input image may be, for example, a combined image.

Object detector 144 detects object candidate rectangles from the input image (for example, image P11 or P22) (S140). Object detector 144 detects, for example, object candidate rectangles from image P11 which is a combined image. It is not limited that object detector 144 extracts object candidate rectangles from a combined image. It is sufficient that object detector 144 extracts object candidate rectangles from an image in which the resolution in the regions other than the regions of interest is lower than the resolution in the regions of interest. Since step S140 is similar to step S30 in FIG. 3 in Embodiment 1, the description thereof is omitted.

Next, object detector 144 performs processing (S150) in which object candidate rectangles are narrowed down by using rectangular templates to processing (S170) in which object detection rectangles are detected. When object detector 144 has obtained, from rectangular template setting unit 142, information indicating that general-purpose rectangular template group 142a is to be used, object detector 144 performs processing in steps S150 to S170 by using the rectangular templates included in general-purpose rectangular template group 142a. Compared to the case where image P1 including regions of interest is uniformly shrunk as in step S133, for example, image P11 has a higher resolution in the regions of interest. Moreover, images P11 and P22 are equal in image size. Accordingly, by using image P11, the object detection performance relative to the regions of interest can be improved while reducing an increase in processing amount of object detector 144. In the present embodiment, people in the regions of interest can be detected with high precision.

Moreover, when object detector 144 has received, from rectangular template setting unit 142, an instruction indicating that sidewalk rectangular template group 142b is to be used for the regions of interest (sidewalk portions R1 and R2) and general-purpose rectangular template group 142a is to be used for other regions or whole region, object detector 144 performs processing in steps S150 to S170 by using general-purpose rectangular template group 142a and sidewalk rectangular template group 142b. Accordingly, the object detection performance relative to the regions of interest can be further improved while reducing an increase in processing amount of object detector 144. In the present embodiment, people in the regions of interest can be detected with higher precision.

In the present embodiment, the image size of the input image is the same between the case where the sensing region includes regions of interest and the case where the sensing region includes no region of interest. Accordingly, the processing amount of object detector 144 in steps S150 to S170 is the same between the case where the sensing region includes regions of interest and the case where the sensing region includes no region of interest.

Object detector 144 then outputs a detection result (S180). Object detector 144 performs processing for applying object detection rectangles to an original camera image (for example, image P1), for example, and outputs the processed camera image. Specifically, object detector 144 corrects the shift in coordinates between the regions of interest and the whole region of the input image to the coordinate positions of the original image data (image P1), and outputs object detection rectangles on image P1. Object detector 144 outputs image P1 illustrated in FIG. 8, for example.

As described above, region-of-interest determining unit 141 of information processing device 140 according to the present embodiment obtains a sensing image from optical sensor 110 including an image sensor. The input information includes an image which is based on the sensing image, and in which the resolution in the regions other than the regions of interest is lower than the resolution in the regions of interest. For example, the input information includes a combined image of an image of the regions of interest cut out from the sensing image and the whole image. The combined image is based on the sensing image. The whole image may have a resolution lower than the resolution in the image of the regions of interest.

With this configuration, information processing device 140 determines the input information to be provided to an object detection model, according to the regions of interest. In the present embodiment, an input image input to the object detection model is determined according to the regions of interest. The object detection performance of the object detection model in the regions of interest is improved by performing object detection processing by using an image having a higher resolution in the regions of interest. As a result, the object detection performance can be improved while reducing an increase in calculation resources required for object detection. Moreover, when both the image of regions of interest and the whole image are input to the object detection model, it is possible to reduce false detection or omission of detection of an object due to cutting out of the regions of interest.

Other Embodiments

The information processing device and the like according to the above embodiments have been described based on the embodiments. However, the present disclosure is not limited to such embodiments.

Accordingly, the structural components described in the accompanying drawings and the detailed description include not only structural components indispensable to solve the outlined problems, but may also include structural components not necessarily indispensable to solve the outlined problems in order to provide examples of the technique. Hence, those structural components not necessarily indispensable should not be deemed essential due to the mere fact that they are described in the accompanying drawings and the detailed description.

Forms obtained by various modifications to the embodiments that can be conceived by a person of skill in the art as well as forms realized by arbitrarily combining structural components and functions in the embodiments which are within the scope of the essence of the present disclosure are also included in the present disclosure.

For example, in the above embodiments, the example has been described where the information processing device is mounted in the mobile body, but the present disclosure is not limited to such an example. The information processing device may be a server device provided externally to the mobile body. It may be that the information processing device receives image data, position information and the like from the mobile body via wireless communication, detects objects based on the received information and map information, and transmits the detection result to the mobile body.

Moreover, in the above embodiments, an example has been described where the object detector is a neural network detector, but the present disclosure is not limited to the example. For example, the object detector may be a pattern matching detector.

Moreover, the rectangular template setting unit in the above embodiments may set rectangular templates to be used for each predetermined region in an image. When the region of interest is sky and the rectangular template setting unit recognizes from the position, the attitude or the like of the optical sensor that the sky which is the region of interest is positioned in the upper region in the image, for example, the rectangular template setting unit may use the rectangular templates appropriate for the sky in the upper half of the image (for example, rectangular templates which allow air vehicles, such as drone, to be easily detected).

In the above embodiments, the rectangular templates (for example, general-purpose rectangular template group and sidewalk rectangular template group) are determined according to the regions of interest. The rectangular templates may further be determined according to the outside environment of the mobile body. The outside environment includes at least one of weather information, time information and the like of the road where the mobile body travels. For example, the sidewalk rectangular template group may include a sidewalk rectangular template group for fine days and a sidewalk rectangular template group for rainy days. The rectangular template setting unit may determine which one of the sidewalk rectangular template groups is to be used from the sensing result of various sensors (for example, wiper sensor which detects an operation of the wiper) included in the mobile body. Note that the sidewalk rectangular template group for rainy days includes, for example, rectangular templates which allow a person with an open umbrella to be easily detected.

Moreover, in the above embodiments, the example has been described where the number of rectangular templates included in the general-purpose rectangular template group is equal to the number of rectangular templates included in the sidewalk rectangular template group. However, the present disclosure is not limited to such an example. The number of rectangular templates included in the sidewalk rectangular template group may be less than the number of rectangular templates included in the general-purpose rectangular template group. The sidewalk rectangular template group does not have to include rectangular templates for detecting objects, such as vehicles, which are other than people, for example. Accordingly the processing amount of the object detector can be further reduced.

Moreover, in the above embodiments, the example has been described where the information processing device according to the embodiments is applied to self-driving vehicles, but the present disclosure is not limited to such an example. For example, the information processing device may be applied to an indoor-use robot or an air vehicle. Moreover, the information processing device may be used for objection detection which uses an indoor positioning method (near field communication, such as Wi-Fi (registered trademark) or BLE (Bluetooth (registered trademark) Low Energy) or Beacon) instead of object detection which uses optical sensors.

Moreover, the processing order described in the above embodiments is an example. The processing order may be changed, and may be performed in parallel.

The respective structural components described in the above embodiments may be realized as software, or may be realized typically as an LSI which is an integrated circuit. These structural components may be individually configured as single chips or may be configured so that a part or all of the structural components are included in a single chip. A plurality of chips may be aggregated in one device, or included in a plurality of devices. The name used here is LSI, but it may also be called IC, system LSI, super LSI, or ultra LSI depending on the degree of integration. The method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used. Moreover, if integrated circuit technology that replaces LSI appear thorough progress in semiconductor technology or other derived technology, the technology can naturally be used to carry out integration of the structural components.

Moreover, the separation of the function blocks in the block diagrams is merely an example, and plural function blocks may be implemented as a single function block, a single function block may be separated into plural function blocks, or part of functions of a function block may be transferred to another function block. The functions of function blocks having similar functions may be processed in parallel or by time-sharing by a single hardware or software.

Additionally, the technique according to the present disclosure may be the above program, or a non-transitory computer-readable recording medium on which the program is stored. Moreover, it is needless to say that the program can be distributed via a transmission medium such as the Internet. For example, the program and the digital signal of the program may be transmitted via a telecommunication line, a wireless or wired communication line, a network represented by the Internet, a data broadcasting and so on. Moreover, the computer program or the digital signal of the program may be implemented by an independent computer system by being stored on the recording medium and transmitted, or sent via the network, for example.

Moreover, all numerical numbers such as ordinal numbers or numeral quantity used in the forgoing description are merely examples for specifically describing the technique according to the present disclosure, and thus, the present disclosure is not limited to the illustrated numbers. The connection relationship between the structural components are illustrated as examples for specifically describing the technique according to the present disclosure. The connection relationships realizing the functions of the present disclosure are not limited to such examples.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is usable in, for example, an information processing device which performs object detection processing related to sensing data, and applicable to, for example, an image recognition system and a self-driving system.

What is claimed is:

1. An information processing device configured to:
obtain sensing data from an optical sensor;
obtain position information of an object which includes the optical sensor;
obtain map information;
determine a specific sensing data region in the sensing data by using the position information and the map information, the specific sensing data region corresponding to a specific region in a sensing region of the optical sensor;
determine, according to the specific sensing data region, input information to be provided to an object detection model; and
cause the object detection model to perform object detection processing by using the input information,
wherein:
a first object rectangular template group including two or more object rectangular templates each having a predetermined aspect ratio according to a geographical attribute determined based on the map information, and a second object rectangular template group including two or more object rectangular templates each having a different aspect ratio, are predetermined; and
the input information includes the first object rectangular template group and the second object rectangular template group, the first object rectangular template group being selected according to the geographical attribute of the specific sensing data region, and being for extracting an object candidate rectangle on which the object detection processing is to be performed from object candidate rectangles each indicating an object candidate in the specific sensing data region, and the second object rectangular template group being for extracting an object candidate rectangle on which the object detection processing is to be performed from object candidate rectangles each indicating an object candidate in a region other than the specific sensing data region.

2. The information processing device according to claim 1, wherein distance information of the sensing data is obtained, and a size of the first object rectangular template group or the second object rectangular template group is set according to the distance information which has been obtained.

3. The information processing device according to claim 1, wherein:
the optical sensor includes an image sensor;
the sensing data includes a sensing image which is an image obtained from the image sensor; and
the input information includes an image in which a resolution in the region other than the specific sensing data region is lower than a resolution in the specific sensing data region, the image being based on the sensing image.

4. The information processing device according to claim 1, wherein:
the optical sensor includes an image sensor;
the sensing data includes a sensing image which is an image obtained from the image sensor;
the input information includes a combined image of an image of the specific sensing data region cut out from the sensing image and a whole image which includes both the specific sensing data region and the region other than the specific sensing data region, the combined image being based on the sensing image; and
the whole image has a resolution lower than a resolution of an image of the specific sensing data region.

5. The information processing device according to claim 1, further configured to:
determine whether the specific sensing data region is included in the sensing data;
when determining that the specific sensing data region is included in the sensing data, determine the input information which includes the first object rectangular template group and the second object rectangular template group; and
when determining that the specific sensing data region is not included in the sensing data determine the input information which includes only the second object rectangular template group out of the first object rectangular template group and the second object rectangular template group.

6. The information processing device according to claim 1,
wherein:
the map information includes one of a road, a sidewalk, a park, and private property;
one of the two or more object rectangular templates included in the first object rectangular template group is used for object detection corresponding to the one of the of the road, the sidewalk, the park, and the private property; and
one of the two or more object rectangular templates included in the second object rectangular template group is used for object detection corresponding to each of the road, the sidewalk, the park, and the private property.

7. The information processing device according to claim 1 wherein:
each of the first object rectangular template group and the second object rectangular template group has a predetermined size which is set in advance; and
the information processing device is further configured to:
obtain distance information on the sensing data; and
change the predetermined size of the first object rectangular template group and the predetermined size of the second object rectangular template group according to the distance information which has been obtained, without changing an aspect ratio.

8. A vehicle including the information processing device according to claim 1, wherein the first object rectangular template group and the second object rectangular template group are determined according to a road where the vehicle travels.

9. An information processing method performed by a processor, the information processing method comprising:

obtaining sensing data from an optical sensor;

obtaining position information of an object which includes the optical sensor;

obtaining map information;

determining a specific sensing data region in the sensing data by using the position information and the map information, the specific sensing data region corresponding to a specific region in a sensing region of the optical sensor;

determining input information to be provided to an object detection model, according to the specific sensing data region; and causing the object detection model to perform object detection processing by using the input information, wherein:

a first object rectangular template group including two or more object rectangular templates each having a predetermined aspect ratio according to a geographical attribute determined based on the map information, and a second object rectangular template group including two or more object rectangular templates each having a different aspect ratio, are predetermined; and the input information includes the first object rectangular template group and the second object rectangular template group, the first object rectangular template group being selected according to the geographical attribute of the specific sensing data region, and being for extracting an object candidate rectangle on which the object detection processing is to be performed from object candidate rectangles each indicating an object candidate in the specific sensing data region, and the second object rectangular template group being for extracting an object candidate rectangle on which the object detection processing is to be performed from object candidate rectangles each indicating an object candidate in a region other than the specific sensing data region.

10. A non-transitory computer-readable recording medium on which a program for causing a computer to perform the information processing method according to claim 9 is recorded.

* * * * *